United States Patent [19]

Green et al.

[11] 4,244,226
[45] Jan. 13, 1981

[54] DISTANCE MEASURING APPARATUS AND A DIFFERENTIAL PRESSURE TRANSMITTER UTILIZING THE SAME

[75] Inventors: Norman F. Green, Warrington; Yoel Keiles, Havertown; William F. Newbold, Philadelphia, all of Pa.; John L. Searle, Camden, N.J.; Douglas W. Wilda, West Chester, Pa.

[73] Assignee: Honeywell Inc., Minneapolis, Minn.

[21] Appl. No.: 81,692

[22] Filed: Oct. 4, 1979

[51] Int. Cl.³ .............................................. G01L 11/00
[52] U.S. Cl. ........................................ 73/703; 73/717; 367/99
[58] Field of Search ................... 73/703, 717; 367/99, 367/108, 114

[56] References Cited

U.S. PATENT DOCUMENTS

| | | | |
|---|---|---|---|
| 2,826,912 | 3/1958 | Kritz | 73/194 |
| 3,008,332 | 11/1961 | Charbonnier et al. | 367/108 |
| 3,087,140 | 4/1963 | O'Neill | 340/38 |
| 3,140,612 | 7/1964 | Houghton et al. | 73/703 |
| 3,212,338 | 10/1965 | O'Maley | 367/108 |
| 3,869,915 | 3/1975 | Baumoel | 73/194 A |
| 3,987,674 | 10/1976 | Baumoel | 73/194 A |
| 4,024,760 | 5/1977 | Estrada, Jr. | 73/194 A |
| 4,079,315 | 3/1978 | Mohr | 324/186 |

FOREIGN PATENT DOCUMENTS 672693  5/1952  United Kingdom ..................... 73/703

Primary Examiner—Donald O. Woodiel
Attorney, Agent, or Firm—Laurence J. Marhoefer; Lockwood D. Burton; Mitchell J. Halista

[57] ABSTRACT

A distance measuring apparatus and a differential pressure transmitter utilizing the same having an ultrasonic element reflector mounted between a pair of ultrasonic transducers. The alternate operation of the ultrasonic transducers produces a pair of transducer energizing signals which are related to the relative separation of the reflector element from the transducers. In one embodiment, the reflector element is mounted within a closed pressure vessel divided internally by an ultrasonic reflector diaphragm with a pair of fluid inlet lines admitting respective pressurized fluids to corresponding sides of the reflector diaphragm. The ultrasonic transducer elements are mounted on the outside of the pressure vessel on an acoustical signal transmitting interface and are arranged to alternately supply an ultrasonic signal through the pressure vessel wall to the respective side of the diaphragm reflector while an analysis of the frequency of operation of each transducer is used to determine the differential pressure applied to the diaphragm.

10 Claims, 6 Drawing Figures

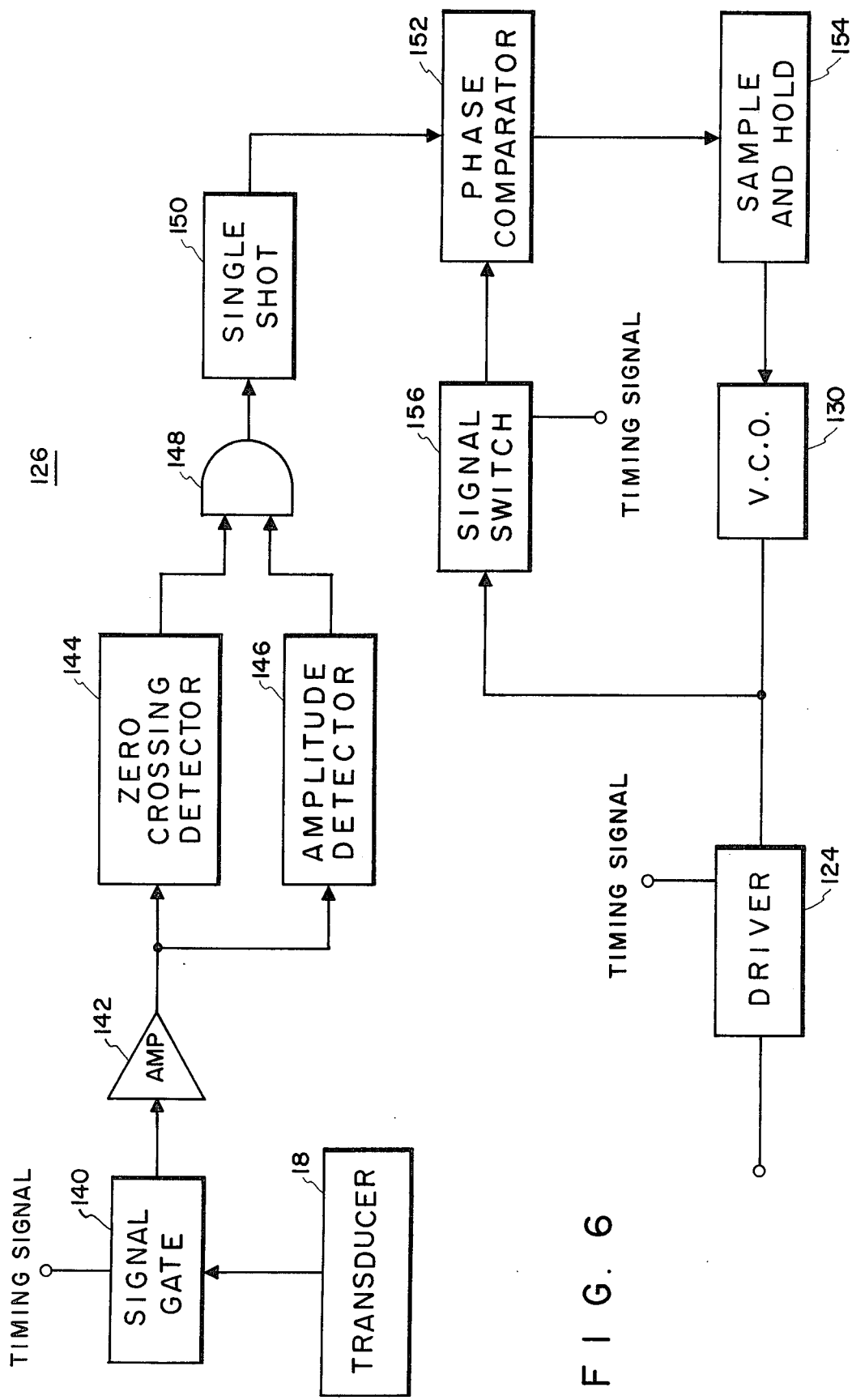
F I G. 6

DISTANCE MEASURING APPARATUS AND A DIFFERENTIAL PRESSURE TRANSMITTER UTILIZING THE SAME

BACKGROUND OF THE INVENTION

1. Field Of The Invention

The present invention relates to ultrasonic devices. More specifically, the present invention is directed to an ultrasonic distance measuring apparatus.

2. Description Of The Prior Art

Ultrasonic sensor devices have been developed for measuring the movement of a reflector element as is shown in U.S. Pat. No. 3,140,612. This type of prior art sensor while providing a means for measuring the relative displacement of a movable reflector element fails to provide a mwethod for obtaining the relative separation of the reflector element from the ultrasonic transducer elements whereby a direct measurement of the distance may be obtained. Accordingly, it is desirable to provide an ultrasonic distance measuring sensor for effecting a measurement of the relative separation of a movable reflector element in a direct manner while eliminating the effect of spurious ultrasonic reflections.

SUMMARY OF THE INVENTION

An object of the present invention is to provide an improved ultrasonic distance measuring sensor.

In accomplishing this and other objects, there has been provided, in accordance with the present invention, distance measuring apparatus having a movable reflector, a first and a second acoustical transducer located on respective sides of the reflector element, energizing means for alternately energizing the acoustical transducers and signal analyzing means for measuring the relative separation of the reflector element from the transducers by analyzing the frequency of operation of each transducer.

BRIEF DESCRIPTION OF THE DRAWINGS

A better understanding of the present invention may be had when the following detailed description is read in connection with the accompanying drawings in which:

FIG. 6 is a schematic illustration of detector circuit 126 shown in FIG. 5.

DESCRIPTION OF THE PREFERRED EMBODIMENT

Detailed Description

Figure 1:
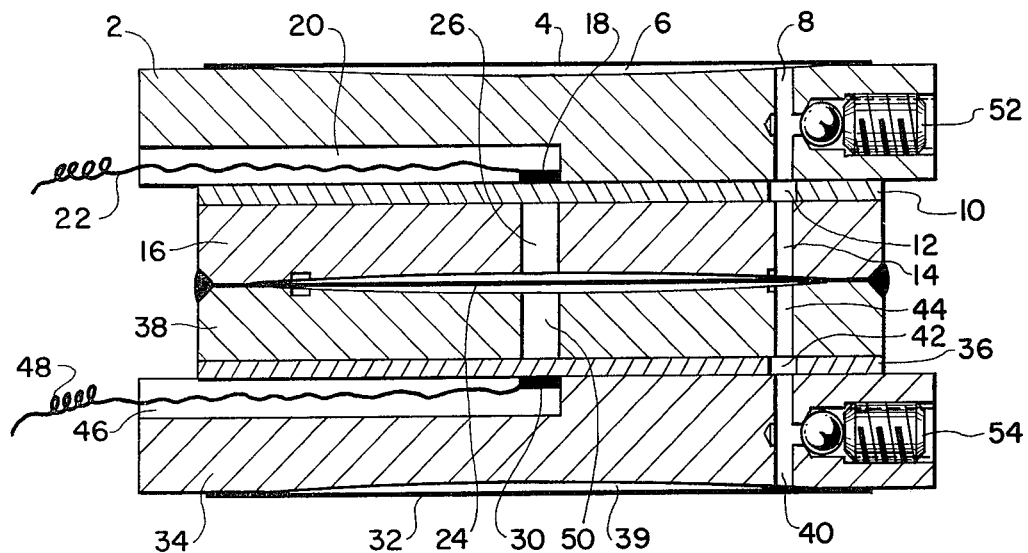
FIG. 1 is a cross-sectional illustration of a differential pressure sensor embodying an example of the present invention.

Referring to FIG. 1 in more detail, there is shown a cross-sectional illustration of a differential pressure transmitter embodying an example of the present invention. For purposes of simplifying the illustration in FIG. 1, the pressure transmitter structure is only partially shown with the input, or barrier, diaphragm cover and the connections to input fluid pressures being omitted since these are conventional. A first plate 2 has a barrier diaphragm 4 attached at its peripheral edge thereto with a space 6 formed by a concave face of the plate 2 beneath the diaphragm 4 therebetween filled with a substantially incompressible fill fluid (not shown). A fluid passage 8 through the plate 2 connects the space 6 between the barrier diaphragm 4 and the plate 2 and an interface spacer 10 located on the other side of the plate 2 from the barrier diaphragm 4. The interface spacer 10 may be any suitable material for transmitting an acoustical signal while providing an acoustical impedance match between an acoustical transducer and an attaching wall, e.g. glass. A hole 12 through the interface spacer 10 continues the fluid passage 8 to a second fluid passage 14 in a first support block 16 of a dimensionally stable material having a minimum coefficient of temperature expansion, such materials being well-known in the art. A first acoustical, or ultrasonic, transducer 18 is located within a recess 20 in the plate 2 and is attached to the interface spacer 10 on the other side thereof from the first support block 16. A connecting wire 22 is arranged to supply electrical power to energize the ultrasonic transducer 18. The electrical wire connection 22 is arranged to leave the plate 2 via the recess 20 and to be connected to suitable associated electrical signal supply means (not shown).

A sensor diaphragm 24 is arranged across the opposite face of the support block 16 from that in contact with the interface spacer 10 which face is provided with a concave shape to enable the fill fluid to be located therein between the concave face and the sensor diaphragm 24. The fluid conduit 14 through the support block 16 conducts the fill fluid from the space 6 beneath the barrier diaphragm 4 to the space between the sensor diaphragm 24 and the support block 16. Another fill fluid conduit 26 is provided through the support block 16 between the first plate 10 at a location aligned with the first transducer 18 and the concave face of the support block 16.

The other side of the pressure transmitter is a substantial duplicate of the structure described above using a second ultrasonic, or acoustical, transducer element 30, a second barrier diaphragm 32, a second plate 34, a second interface spacer 36 and a second support block 38. Thus, the second barrier diaphragm 32 is attached at its peripheral edge to the second plate 34 to form an internal volume 39 between a concave face of the plate 34 and the barrier diaphragm 32. A fluid passage 40 is arranged to connect the space 39 to the other side of the plate 34. A hole 42 in the interface spacer 36 is arranged to form a continuation of the fluid passage 40 while a fluid passage 44 in the second support body 38 forms a further continuation of the fluid passage between the hole 42 and the other side of the second support body 38.

The second ultrasonic transducer is located within a recess 46 in the second plate 34 and is connected by a connecting wire 48 to a source of an energizing electrical signal (not shown). The second transducer element 30 is aligned with a fluid conduit 50 passing through the second support block 38 and is attached to the interface spacer 36 on the other side of the spacer 36 from the support block 38. The sensor diaphragm 24 concurrently covers a concave face on the support block 38 on the other side of the support block 38 from the interface spacer 36. A pair of convential fluid fill ports 52 and 54 are arranged to provide a means for supplying a first and a second fill fluid to the respective fluid channels in the pressure transmitter. The first and second support blocks 16, 38 are attached to the sensor diaphragm 24 at the outer peripheral edge of the diaphragm 24 by any suitable means to produce a fluid tight composite structure, e.g., a continuous weld bead. The other elements of the pressure transmitter structure illustrated in FIG. 1 are held together along with the elements not illustrated in FIG. 1 by conventional means, such means being well-known in the art.

Figure 2:
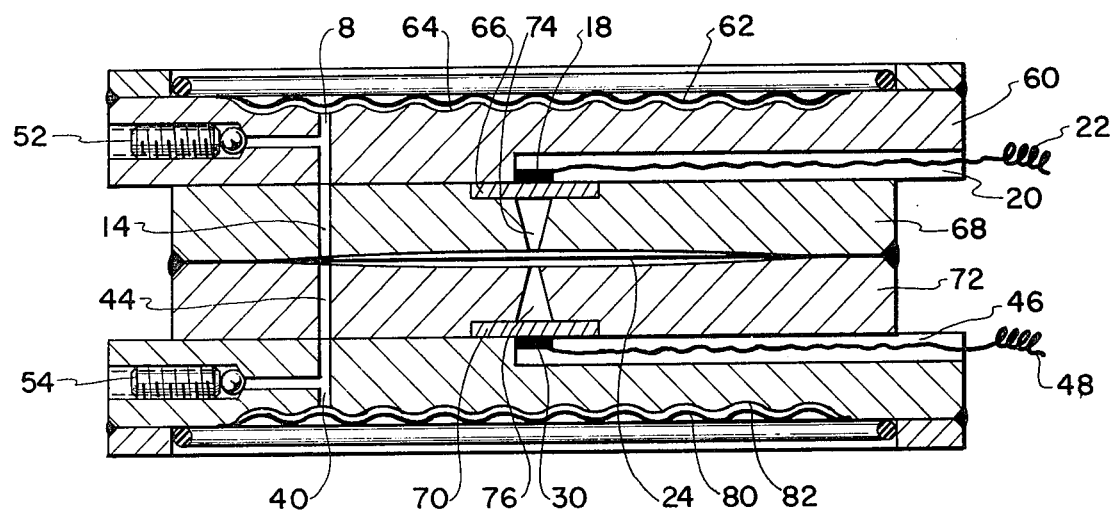
FIG. 2 is a cross-sectional illustration of a differential pressure transmitter body for use with an external sensor.

In FIG. 2, there is shown a cross-sectional illustration of a modification of the differential pressure transmitter structure shown in FIG. 1 and also embodying an example of the present invention. Similar reference numbers have been used to indicate elements of this structure common to the pressure transmitter shown in FIG. 1. Thus, the first and second transducers 18, 30 are located in recesses 20, 46 and are connected by respective wires 22, 48 to associated energizing signal apparatus (not shown). The recess 20 is located in a first plate 60 which is combined with an annularly convoluted barrier diaphragm 62 spaced from a matching convoluted face 64 of the plate 60 to provide an internal volume for a first fill fluid. A first acoustic interface impedance matching spacer 66 is located within a recess provided in a face of a first support body 68 adjacent to the first acoustic transducer 18. A second acoustic interface spacer 70 is located in a recess provided in a face of a second support body 72 adjacent to the second transducer element 30. A fluid conduit 74 is located between the interface spacer 66 and an opposite concave face of the first support block 68 while being aligned with the transducer 18. Similarly, a fluid conduit 76 is located in the second support block 72 between the transition spacer 70 and an opposite concave face of the second support block 72 while being aligned with the second transducer 30. Additionally, a second convoluted barrier diaphragm 80 is spaced from a mating convoluted surface 82 of the second plate to provide an internal volume for a second fill fluid therebetween.

Figure 3:
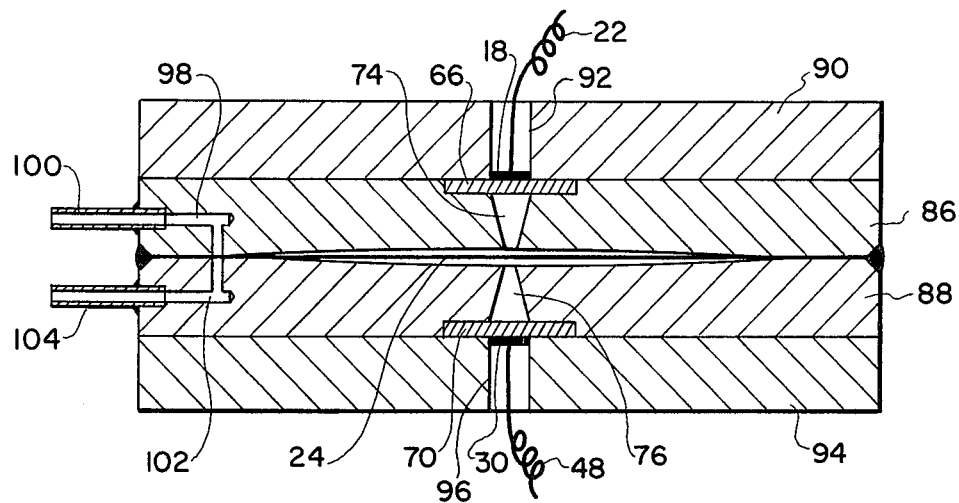
FIG. 3 is a cross-sectional view of an external sensor for use with the body shown in FIG. 2 and also embodying an example of the present invention.
Figure 4:
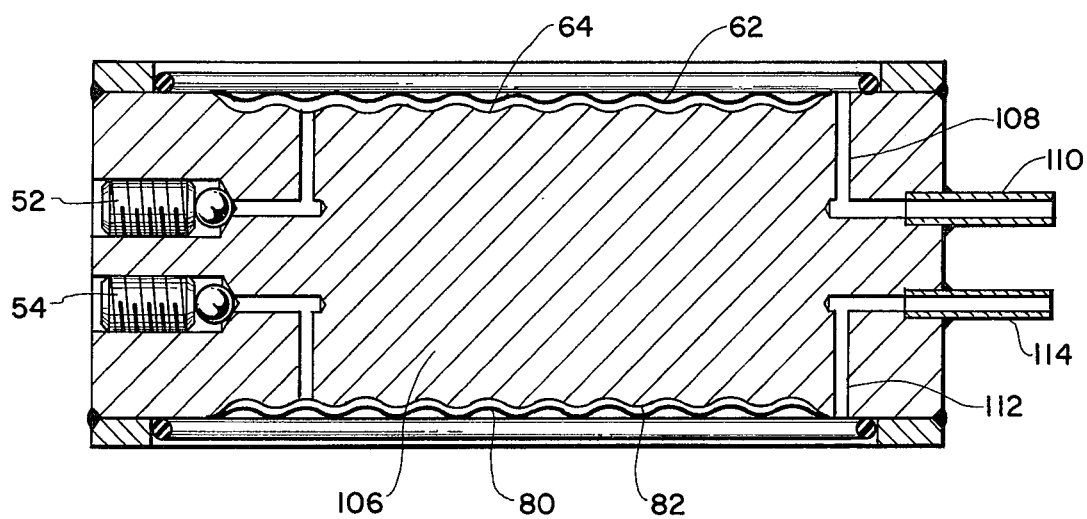
FIG. 4 is a cross-sectional illustration of another differential pressure sensor structure, also embodying an example of the present invention

In FIG. 3, there is shown a cross-sectional illustration of an external differential pressure sensor for use with a pressure transmitter body as shown in FIG. 4. Similar reference numbers have been used in FIGS. 3 and 4 to denote elements common to the structures shown in FIGS. 1 and 2. Thus, the first acoustic transducer element 18 is mounted on a first interface spacer 66 which, in turn, is located in a recess in a face of a first support body 86. The second transducer 30 is mounted on a second interface spacer 70 which, in turn, is located in a recess in a second support body 88. A first plate 90 is positioned on top of the first support body 86 and has a hole 92 extending therethrough to allow the connecting wire 22 to be attached between the first transducer 18 and a source of transducer energizing signals (not shown). Similarly, a second plate 94 has a hole 96 therethrough to allow a connecting wire 48 to be attached between the second transducer 30 and a source of transducer energizing signals (not shown). A first fluid conduit 98 is provided in the first support block 86 to connect the concave face of the block 86 adjacent to the diaphragm 24 to one end of an externally projecting fluid pipe 100. The fluid pipe 100 is fastened with a fluid tight seal to the block 86 and projects therefrom to provide a means for effecting a fluid connection to the fluid pipe 100. Similarly, a second fluid conduit 102 is provided in the second support block 88 to connect the concave face of the second block 88 adjacent to the diaphragm 24 to one end of a second fluid pipe 104. The second fluid pipe 104 is provided with a fluid tight seal to the block 88 and projects therefrom to provide a connection for a fluid connector thereto.

In FIG. 4 there is shown a fluid transmitter body for use with the sensor assembly shown in FIG. 3. The fluid transmitter body includes a body block 106 which has the convoluted barrier diaphragm 62 and 80 located adjacent to mating convoluted surfaces 64 and 82 on opposite faces thereof. A first fluid conduit 106 is provided within the body block 108 to connect the space between the first barrier diaphragm 62 and the mating back-up surface 64 with one end of a fluid pipe 110 which is sealed to the body block 106 and projects therefrom. A second fluid conduit 112 is provided within the body block 106 to connect the space between the second diaphragm 80 and the back-up surface 82 to one end of a second fluid pipe 114 which is also sealed to the body block 106 and projects therefrom. The fluid pipes 110 and 114 of the body block 106 are arranged to be connected by any suitable means (not shown) to the projecting pipes 100 and 104 shown in the sensor assembly of FIG. 3.

Figure 5:
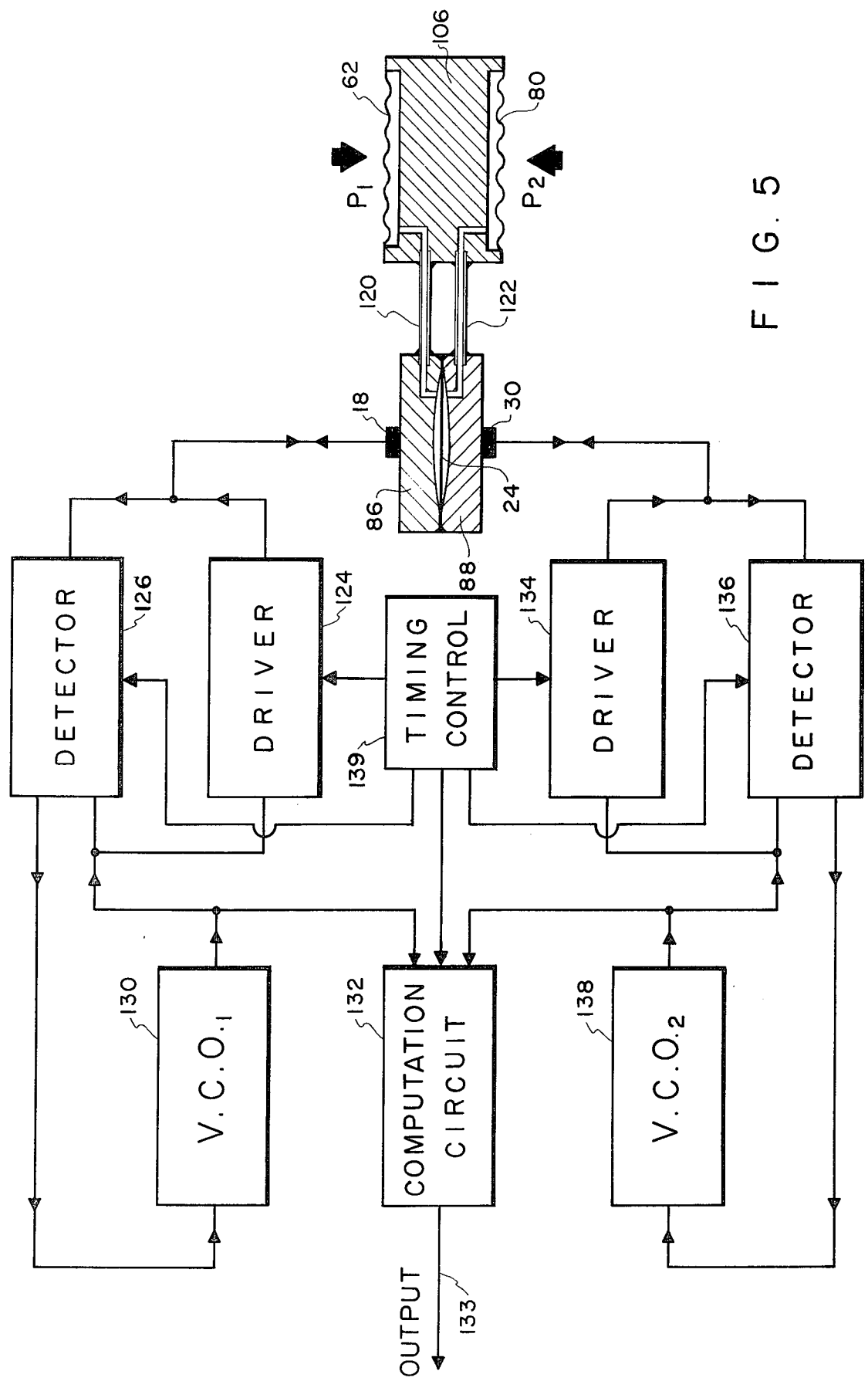
FIG. 5 is a schematic illustration of a block diagram of a signal analysis circuit suitable for use with the pressure transmitter shown in FIGS. 1 to 4.

In FIG. 5 there is shown a simplified block diagram of a circuit for energizing the acoustic transducers used in the pressure transmitter shown in FIGS. 1 through 4 for detecting the signals received from the transducers. An exemplary pressure transmitter using a remote sensor arrangement with input pressures $P_1$ and $P_2$ is shown in a simplified representation in FIG. 5 of the remote sensor structure previously described in respect to FIGS. 3 and 4. Similar reference numbers have been used in FIG. 5 to indicate the elements previously described with reference to FIGS. 3 and 4. Additionally, the remote sensor assembly is connected to the transmitter block by fluid conduits 120 and 122 which connect the respective projecting fluid pipes previously described with reference to FIGS. 3 and 4. A first transducer driver 124 is connected to the first transducer 18 to provide an energizing signal therefor. A first detector circuit 126 is also connected to the first transducer 18 to receive an output signal therefrom. The output of the detector circuit is applied to a first voltage controlled oscillator 130 to adjust its frequency output signal. The output of the voltage controlled oscillator 130 is applied to the detector circuit and to the driver circuit. Additionally, the output of the voltage controlled oscillator 130 is applied to a computing or signal analyzing circuit 132 as an indication of the signal derived from the reception of an acoustic signal by the first transducer 18. The signal analyzing circuit 132 has an output 133 on which is ultimately provided an output representative of the differential pressure between input pressures $P_1$ and $P_2$.

Similarly, a second driver circuit 134 is connected to the second transducer 30 to provide an energizing signal thereto. A second detector circuit 136 is connected to the second transducer 30 to receive an output signal therefrom. The output signal from the detector 136 is applied to a second voltage controlled oscillator 138 to adjust its frequency. The output signal from the voltage controlled oscillator 138 is applied to the second driver circuit 134 and to the second detector circuit 136 and to the analyzing circuit 132 to provide an input signal thereto indicative of the output signal from the second transducer 30. A timing control circuit 139 is used to supply timing signals to control the sequence of operation of the detectors 126, 136, the drivers 124, 134 and the computation circuit 132. While two pairs of driver and detector circuits are shown in FIG. 5, it is obvious that a single pair of driver and detector circuits could be used with suitable switching circuits controlled by the timing control 139 for multiplexing the single pair of circuits between the respective transducers and voltage controlled oscillators.

A schematic illustration of a circuit suitable for use as a detector circuit, i.e., detector 126, is shown in FIG. 6. An output signal from the respective transducer, i.e., transducer 18, is applied through a first timing signal controlled signal gate 140 to the input of a signal amplifier 142. An output from the amplifier 142 is applied to the input of a zero crossing detector 144 and an amplitude detector 146, such devices being well-known in the art. The outputs from the zero crossing detector 144 and the amplitude detector 146 are applied to the corresponding inputs of a two-input AND gate 148. The output of the AND gate 148 is applied to the input of a single-shot astable multivibrator 150 to produce an output pulse therefrom which is applied to the input of a phase comparator 152. The phase comparator 152 is used to compare the phase of the pulse signal from the single-shot 150 with the output of a corresponding voltage controlled oscillator, i.e., V.C.O. 130, applied to the phase comparator 152 through a second timimg signal controlled signal switch 156. An output from the phase comparator 152 is applied to a sample-and-hold circuit 154 having an output applied to control the frequency of the V.C.O. 130. The output of the V.C.O. 130 is also applied to the input of the driver 124 as previously described with respect to FIG. 5.

The operation of the present invention to detect the distance of the reflector diaphragm within the pressure transmitter from an acoustic transducer may be simplified in the general case of a distance measuring apparatus. At the start of operation, i.e., time equals zero, the first transducer would emit an acoustic pulse, e.g., 100 KH, aimed at the reflector which is assumed to be at a distance X from that transducer. At a time $$\frac{2X}{C},$$

where C the speed of sound in the medium separating the transducer from the reflector, the reflected signal would arrive back at the first transducer. Immediately thereafter, a second acoustic pulse is sent from the second transducer to the reflector. The second pulse is reflected off the other side of the reflector and arrives back at the second transducer at a time $$\frac{2(X_O - X)}{C},$$

where $X_O$ is the distance between the two transducers. If the two time periods are designated T1 and T2 then $$\frac{T1}{T1 + T2} = \frac{2CX}{2C(X_O - X) + 2CX} = \frac{X}{X_O}$$

If during time T1, an RC filter is switched by a control means responding to the times $T_1$ and $T_2$ to a reference voltage and during T2 is grounded, the filter output will be $$\frac{X}{X_O}$$

which provides the position determining function. While this operation would provide a non-interfering alternate mode of operation to avoid interference between signals transmitted through the reflector diaphragm, it is not directly applicable to the determination of a diaphragm position in a relatively small pressure transmitter wherein the diaphragm position would require the measurement of micro-inches over a total diaphragm movement of thousandths of an inch, e.g., 0.005 inches, as represented by differences in arrival times of picoseconds, i.e., $10^{-12}$.

In order to provide this capability, the circuit shown in FIG. 6 is used to detect phase differences in the reflected signals on each side of the reflector when compared with a corresponding output of a voltage controlled oscillator driving the transducer on the same side of the reflector element, e.g., 6 KH difference in a 100 KH signal. Thus, the detector circuit on each side of the reflector element functions in the manner of a phase-lock-loop type of circuit to maintain the frequency of a corresponding voltage controlled oscillator at a frequency having a zero phase relationship with the reflected signal from the same side of the reflector element. This frequency is determined by the position of the reflector element and is, accordingly, representative of the applied input pressure, i.e., pressure $P_1$ in the aforesaid example. Similarly, the frequency output of the second voltage controlled oscillator 138 is representative of the second input pressure $P_2$. A sample-and-hold circuit may be used in each detector circuit, i.e., sample-and-hold circuit 154, to maintain the frequency of the corresponding voltage controlled oscillator, i.e., oscillator 130, during the alternate operation of the circuit illustrated in FIG. 5.

The two frequency outputs $F_1$ and $F_2$ from the voltage controlled oscillators 124, 134, respectively, are applied to the computation circuit 132 for analysis to produce an output signal representative of differential pressure. The computation circuit 132 may be either analog in nature in which case it could directly with the frequency signals from the voltage controlled oscillators or digital in operation in which case it would use analog-to-digital converters, digital processor circuits, i.e., a digital computer, and, if necessary for a suitable output on line 133, a digital to analog converter, such devices being well-known in the art. In either case, the computation is performed on either a solution of $$\frac{f_2 - f_1}{f_1 + f_2} \text{ or } \frac{f_2 - f_1}{f_2}$$

with the former being preferred since it affords less sensitivity to temperature effects and is linear with respect to the diaphragm distance transmitter structure. The latter computation however yields a compensation for the inherent non-linearity for the diaphragm deflection equation. Both of these techniques are preferable over a simple relationship between a difference in the frequencies, i.e., $\Delta f$, and the differential pressure which is also inherently non-linear. Of course, other linearizing techniques, such as using a stored table of linearized values in a digital memory, may also be employed. The resulting output from the computing circuit 132 is the relative distance of the reflector from the transducers which is representative of the difference in the input pressure $P_1$ and $P_2$, i.e., differential pressure.

Accordingly, it may be seen that there has been provided, in accordance with the present invention, an improved distance measuring apparatus and a differential pressure transmitter utilizing the same.

The embodiments of the invention in which an exclusive property or privilege is claimed are as follows:

1. A distance measuring apparatus comprising
first acoustical signal transducer means,
second acoustical signal transducer means,
acoustical signal reflector means located between said first and second transducer means to reflect respective acoustical signals back to said first and second transducer means,
first transducer energizing means for selectively energizing said first transducer means with an energizing signal response to a first control signal,
second transducer energizing means for selectively energizing said second transducer means with an energizing signal in response to a second control signal,
control means for alternately applying said first and second control signals to said first and second energizing means and
signal analyzing means connected to an output of said first and second transducer energizing means to receive said energizing signals and to produce an output signal representative of the relative distance between said reflector element and each of said first and second transducer means.

2. A distance measuring apparatus as set forth in claim 1 wherein said first and second transducer means each include a single acoustical signal producing and receiving element.

3. A distance measuring apparatus as set forth in claim 1 wherein said first and second transducer means each include a single acoustical signal producing and receiving element and a detector means connected to said element for producing an output signal in response to an output signal from said element representative of a reflected acoustical signal from said reflector means.

4. A distance measuring apparatus as set forth in claim 3 wherein said first and second energizing means each include a voltage controlled oscillator having an input connected to receive said output signal from said detector means in a corresponding one of said first and second transducer means and an output, a transducer driver having an input connected to said output of said oscillator and having an output connected to said element of a corresponding one of said first and second transducer means.

5. A distance measuring apparatus as set forth in claim 4 wherein said signal analyzing means is connected to said output of said oscillator.

6. A distance measuring apparatus as set forth in claim 5 wherein said signal analyzing means is arranged to produce an output signal representative of the difference between the first and second oscillator signals divided by the sum of the first and second oscillator signals.

7. A differential pressure transmitter comprising
first acoustical signal transducer means,
second acoustical signal transducer means,
acoustical signal reflector means located between said first and second transducer means to reflect respective acoustical signals back to said first and second transducer means,
housing means for supporting said first and second transducer means in a fixed and spaced apart relationship and having a closed volume divided by said signal reflector means into two separate chambers, a first inlet means for introducing a first pressure force to one side of said reflector means in a first one of said chambers, and a second inlet means for introducing a second pressure force to another other side of said reflector means in a second one of said chambers,
first transducer energizing means for selectively energizing said first transducer means with an energizing signal response to a first control signal,
second transducer energizing means for selectively energizing said second transducer means with an energizing signal in response to a second control signal,
control means for alternately applying said first and second control signals to said first and second energizing means and
signal analyzing means connected to an output of said first and second transducer energizing means to receive energizing signals and to produce an output signal representative of the differential pressure between said first and second pressure forces applied to said reflector element.

8. A differential pressure transmitter as set forth in claim 7 wherein said first and second transducer means each include a single acoustical signal producing and receiving element and a detector connected to said element to produce an output signal in response to an output signal from said element representative of a reflected acoustical signal from said reflector means.

9. A differential pressure transmitter as set forth in claim 8 wherein said first and second energizing means each include a voltage controlled oscillator having an input connected to receive said output signal from a detector in a corresponding one of said first and second transducer means and an output, a transducer driver having an input connected to said output of said oscillator and having an output connected to said element of a corresponding one of said first and second transducer means.

10. A differential pressure transmitter as set forth in claim 9 wherein said signal analyzing means is connected to said output of said oscillator and is arranged to produce an output signal representative of the difference between the first and second oscillator signals divided by the sum of the first and second oscillator signals.

* * * * *